(12) United States Patent
Ohta

(10) Patent No.: US 9,662,574 B2
(45) Date of Patent: May 30, 2017

(54) NETWORK GAME SYSTEM, GAME APPARATUS, STORAGE MEDIUM AND GAME CONTROL METHOD

(71) Applicant: NINTENDO CO., LTD., Kyoto (JP)

(72) Inventor: Keizo Ohta, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 226 days.

(21) Appl. No.: 14/588,687

(22) Filed: Jan. 2, 2015

(65) Prior Publication Data

US 2015/0190718 A1 Jul. 9, 2015

(30) Foreign Application Priority Data

Jan. 6, 2014 (JP) ................. 2014-000161

(51) Int. Cl.
*A63F 13/12* (2006.01)
*A63F 13/35* (2014.01)
*A63F 13/67* (2014.01)

(52) U.S. Cl.
CPC ............. *A63F 13/35* (2014.09); *A63F 13/67* (2014.09); *A63F 2300/535* (2013.01)

(58) Field of Classification Search
CPC .................. A63F 13/12; A63F 13/10
See application file for complete search history.

(56) References Cited

U.S. PATENT DOCUMENTS 5,738,583 A * 4/1998 Comas ............... A63F 13/12
 463/40
2002/0022520 A1 * 2/2002 Oe .................. A63F 13/10
 463/42

OTHER PUBLICATIONS

"Super Mario Advance 4 Perfect Game Guide Book", Kadokawa Corporation Enterbrain Brand Company, Sep. 5, 2003, 3 pages, with partial translation, 1 page.

* cited by examiner

*Primary Examiner* — Omkar Deodhar
(74) *Attorney, Agent, or Firm* — Nixon & Vanderhye PC

(57) ABSTRACT

A non-limiting example network game system includes a server, and the server is connected with a plurality of game apparatuses in a communication-capable manner via a network. If a player object receives damage or is hindered from advancing during play of a local game by a hindrance object such as an enemy object, each game apparatus notify information about the hindrance object to the server. The server totals the number of times of giving damage, etc. to the player object for each hindrance object based on notice from each game apparatus. At a time of starting the local game, the game apparatus acquires a total result from the server, and changes an image of the hindrance object based on the total result.

23 Claims, 10 Drawing Sheets

FIG. 3
(A) GAME SCREN 100
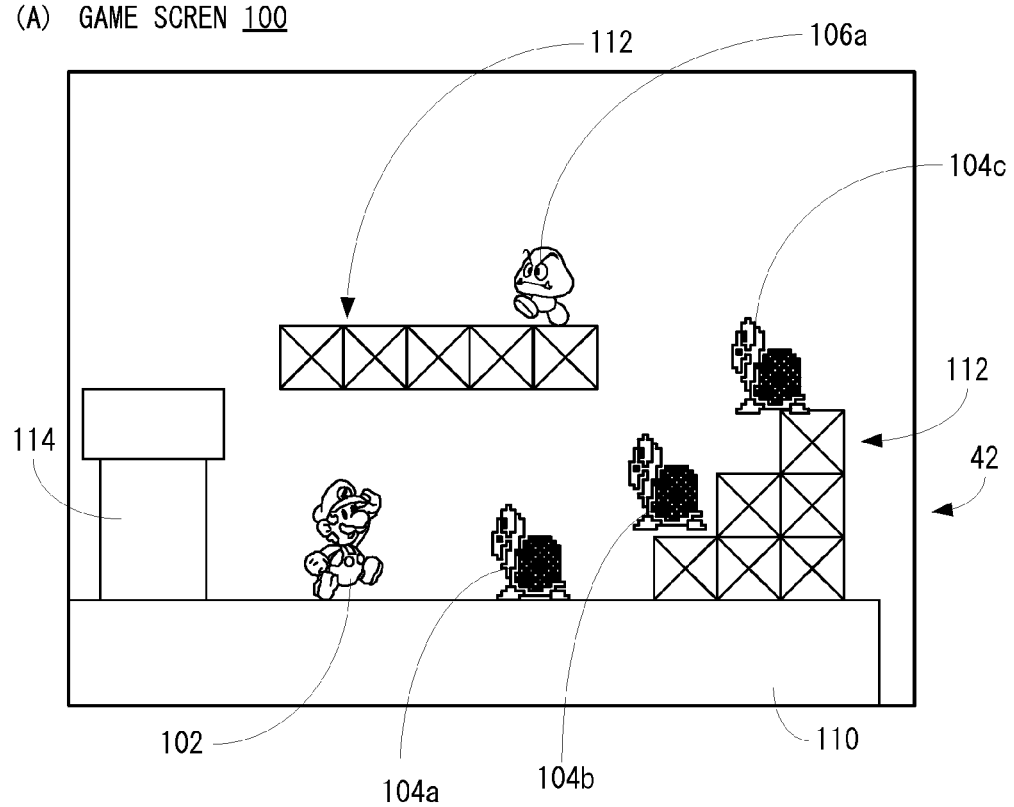
(B) GAME SCREN 100
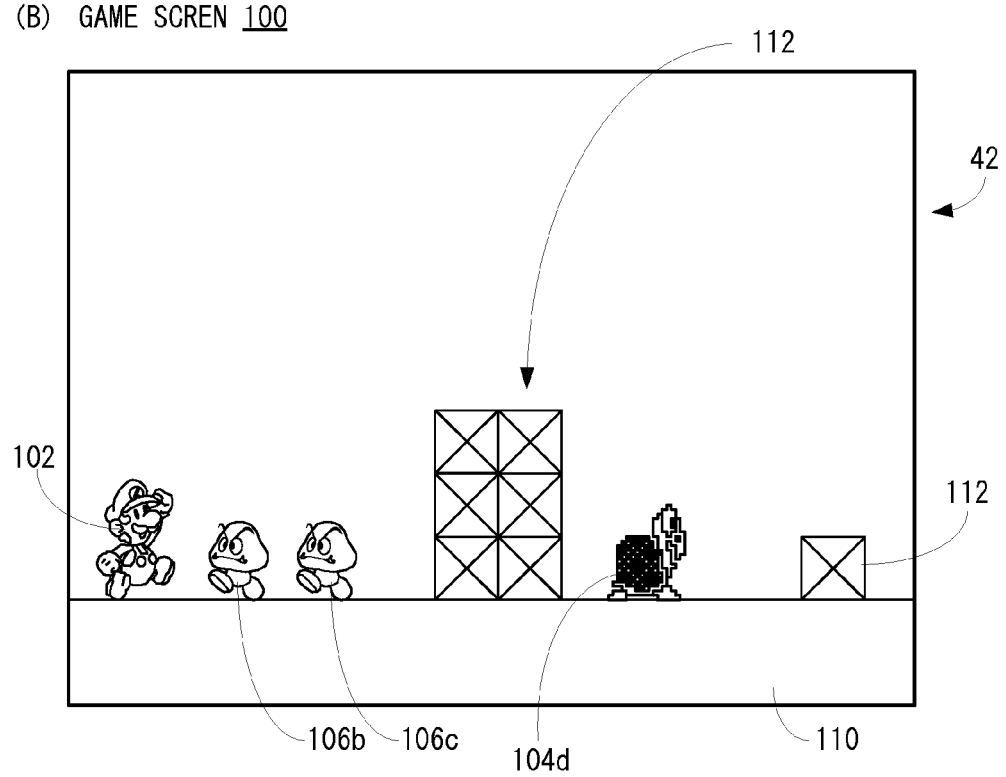

FIG. 4
(A) FIRST STEP (DIFFICULTY=ORDINARY)
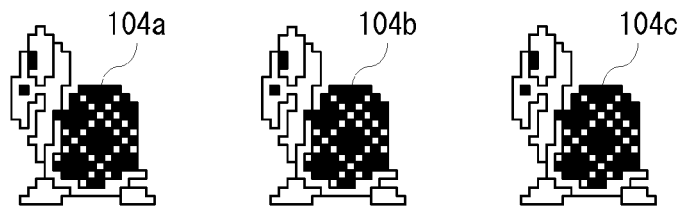
(B) SECOND STEP (DIFFICULTY=LITTLE HIGH)
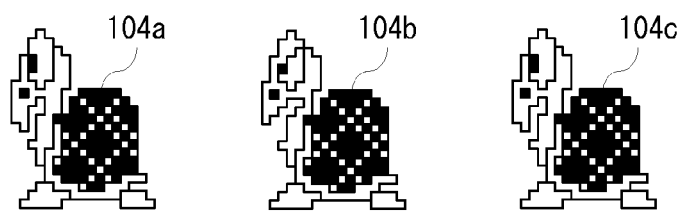
(C) THIRD STEP (DIFFICULTY=HIGH)
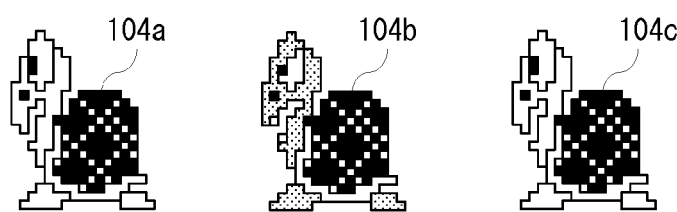
(D) FOURTH STEP (DIFFICULTY=HIGHEST)
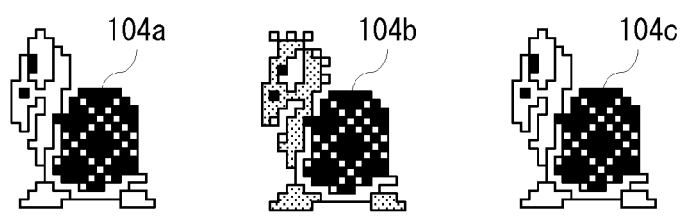

FIG. 5

(A) STATISTICAL DATA FOR EACH GAME (SERVER SIDE)

GAME ID

| TOTAL IN FIRST STAGE | TOTAL IN SECOND STAGE | TOTAL IN THIRD STAGE | ... | TOTAL IN m-TH STAGE |
|---|---|---|---|---|

| NUMBER OF TIMES OF HINDRANCE OF FIRST OBJECT | NUMBER OF TIMES OF HINDRANCE OF SECOND OBJECT | ... | NUMBER OF TIMES OF HINDRANCE OF n-TH OBJECT |
|---|---|---|---|

| SUBTOTAL IN FIRST PERIOD | SUBTOTAL IN SECOND PERIOD | SUBTOTAL IN THIRD PERIOD | SUBTOTAL IN FOURTH PERIOD | SUBTOTAL IN FIFTH PERIOD | ... | SUBTOTAL IN p-TH PERIOD |
|---|---|---|---|---|---|---|

(B) DETERMINATION METHOD OF THRESHOLD VALUES FOR DETERMINING DISPLAYING STEPS (GAME APPARATUS SIDE)

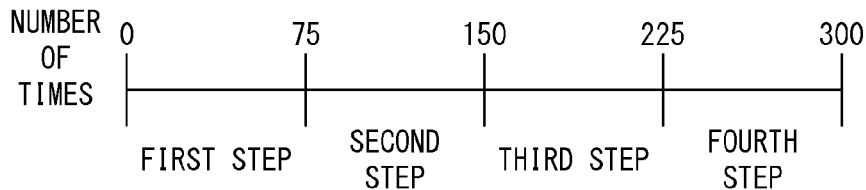

(C) ANOTHER DETERMINATION METHOD OF THRESHOLDS VALUES FOR DETERMINING DISPLAYING STEPS (GAME APPARATUS SIDE)

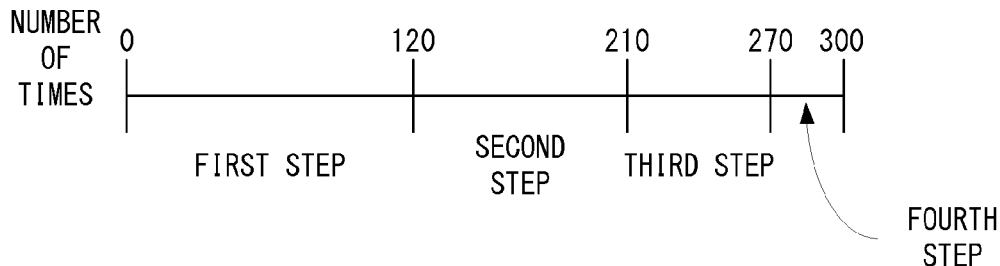

NETWORK GAME SYSTEM, GAME APPARATUS, STORAGE MEDIUM AND GAME CONTROL METHOD

CROSS REFERENCE OF RELATED APPLICATION

The disclosure of Japanese patent application No. 2014-000161 filed on Jan. 6, 2014 is incorporated by reference.

FIELD

This application describes a network game system, game apparatus, storage medium and game control method, wherein a game is played using information collected from a plurality of game apparatuses.

SUMMARY

A primary object of embodiments is to provide a novel network game system, game apparatus, storage medium and game control method.

Furthermore, another object of the embodiments is to provide a network game system, game apparatus, storage medium and game control method, capable of easily knowing an object that hinders progress of a game by many other players.

A first embodiment is a network game system that comprises a server and a plurality of game apparatuses. Each of the plurality of game apparatuses comprises a first data sending module, a data acquisition module and a displaying change module. The first data sending module is configured to send first data according to progress of a game to the server. The data acquisition module is configured to acquire second data based on a total of the first data according to the progress of the game in the plurality of game apparatuses from the server. Each game apparatus acquires the information (the second data) that totals the first data according to the progress of the game of the plurality of game apparatuses. The displaying change module is configured to change displaying of an object that appears in the game based on the second data that is acquired by the data acquisition module.

According to the first embodiment, since an image of the object is changed based on the information that is totaled by the server, it is possible to easily know, during play of the game, an object that affects the progress of the game by many other players. Therefore, it is possible to make feelings of play richer. Furthermore, since the appearance of the object is only changed, a development cost can be suppressed.

A second embodiment is according to the first embodiment, wherein the data sending module is configured to send the first data about information on a hindrance object that hinders the progress of the game to the server.

According to the second embodiment, since it is possible to know the object that hinders the progress of the game by many other players, the game can be played by referring to such knowledge.

A third embodiment is according to the second embodiment, wherein the server includes a data reception module, a total module and a second data sending module. The data reception module is configured to receive the first data that is sent by the first data sending module. The total module is configured to total the number that the progress of the game is hindered based on the first data received by the data reception module. The second data sending module is configured to send the second data that is totaled by the total module to the game apparatus. Therefore, the displaying change module changes the displaying of the hindrance object according to the number that the progress of the game is hindered.

According to the third embodiment, it is possible to change the object that hinders the progress of the game by many other players in its displaying according to the number of hindrance.

A fourth embodiment is according to the third embodiment, wherein the displaying change module is configured to change the displaying of the hindrance object that hinders the progress of the game when the number that the progress of the game is hindered is equal to or more than a predetermined value. That is, when the number that is totaled is less than the predetermined value, the displaying of the object is not changed.

According to the fourth embodiment, since the displaying of the object is changed when the number that is totaled is equal to or more than the predetermined value, the displaying of the object can be changed based on the progress of the game of many players.

A fifth embodiment is according to the third embodiment, wherein the displaying change module is configured to make a degree of changing the displaying of the hindrance object larger as the number that hinders the progress of the game becomes larger.

According to the fifth embodiment, a player or user who looks at the object can know a magnitude (large or small) of the number that hinders the progress of the game by the degree of change of the displaying.

A sixth embodiment is according to the fifth embodiment, wherein the displaying change module is configured to change the displaying of the hindrance object in multi-steps.

According to the sixth embodiment, since the displaying of the object is changed in multi-steps, it is possible to notify to the player in detail the magnitude of the number that the object hinders the progress of the game.

A seventh embodiment is according to the third embodiment, wherein the displaying change module is configured to change the displaying of the hindrance object according to the number of the hindrance objects that hinder the progress of the game.

According to the seventh embodiment, it is possible to change the object that hinders the progress of the game of many other players according to the number of the objects that hinders the progress of the game in its displaying.

An eighth embodiment is according to the first embodiment, wherein the game apparatus further comprises an image data storing module that is configured to store image data corresponding to images before and after changing the displaying of the object.

According to the eighth embodiment, since the image data corresponding to the images before and after changing the displaying of the object is stored by an own image data storing module of each game apparatus, the server should just total the first data according to the progress of the game that is sent from each game apparatus. Therefore, it is possible to reduce the cost concerning the development as much as possible.

A ninth embodiment is according to the first embodiment, wherein the game apparatus further comprises a sound change module that is configured to change a sound concerning an object that appears in the game based on the second data that is acquired by the data acquisition module. For example, the sound concerning the object is changed instead of the change of the displaying or together with the change of the displaying.

According to the ninth embodiment, it is possible to also know the object that affects the progress of the game by a change of the sound.

A tenth embodiment is according to the first embodiment, wherein the game is a local game that is executed in the game apparatus. The displaying of the object that appears in this local game is changed using the second data that totals the first data according to the progress of the local game that is played by the plurality of game apparatuses.

According to the tenth embodiment, by getting to know the progress of the local game that is played by the plurality of other game apparatuses by the change of the displaying of the object, the local game can be played with referring to the change of the displaying.

An eleventh embodiment is according to the first embodiment, wherein the first data sending module is configured to send the first data to the server at a predetermined timing during the game. For example, the first data sending module sends the first data at a time that the progress of the game has change or the game is ended.

According to the eleventh embodiment, since the first data is sent at the predetermined timing, it is possible to send the first data at a timing that does not have a bad influence on game processing, for example.

A twelfth embodiment is according to the first embodiment, wherein the data acquisition module is configured to acquire the second data from the server at a time of starting the game. For example, when starting the main routine of the game or when starting each stage, the second data is acquired.

According to the twelve embodiment, it is possible to acquire the second data when required.

A thirteenth embodiment is according to the third embodiment, wherein the total module is configured to subtotal the number that hinders the progress of the game for each unit time period that is shorter than a predetermined time period and to total subtotals other than the number that is being subtotaled when the second data is requested from the game apparatus.

According to the thirteenth embodiment, since subtotaling is continued about the number of hindrance that is currently subtotaled, and the subtotal for each unit time other than the number that is currently subtotaled is totaled, a calculation is made simple because the subtotal is not changed during calculation.

A fourteenth embodiment is a game apparatus, comprising: a first data sending module configured to send first data according to progress of a game to a server; a data acquisition module configured to acquire second data based on a total of the first data according to the progress of the game of a plurality of game apparatuses from the server; and a displaying change module configured to change displaying of an object that appears in the game based on the second data that is acquired by the data acquisition module.

A fifteenth embodiment is a non-transitory computer readable storage medium storing a game program to be executed by a game apparatus, wherein the game program causes a computer of the game apparatus to function as: a first data sending module configured to send first data according to progress of a game to a server; a data acquisition module configured to acquire second data based on a total of the first data according to the progress of the game of a plurality of game apparatuses from the server; and a displaying change module configured to change displaying of an object that appears in the game.

A sixteenth embodiment is a game control method that a computer of a game apparatus performing steps of: (a) sending first data according to progress of a game to a server; (b) acquiring second data based on a total of the first data according to the progress of the game of a plurality of game apparatuses from the server; and (c) changing displaying of an object that appears in the game based on the second data that is acquired in the step (b).

Also in the fourteenth to sixteenth embodiments, it is possible to know easily an object that affects the progress of the game of many other players during play of the game.

The above described objects and other objects, features, aspects and advantages of the embodiments will become more apparent from the following detailed description when taken in conjunction with the accompanying drawings.

BRIEF DESCRIPTION OF THE DRAWINGS

FIG. 3 shows a non-limiting example of a game screen that is displayed on a display of the game apparatus in a case of playing a local game.

FIG. 4 shows a non-limiting example of a case where a display manner of an enemy object of the same kind is changed according to the number of times of damage.

FIG. 5 is a schematic view showing a non-limiting example of specific contents of statistics for each game at a side of a game server and a non-limiting example of determination method that determines a displaying manner at a side of to game apparatus.

DETAILED DESCRIPTION OF NON-LIMITING EXAMPLE EMBODIMENTS

Figure 1:
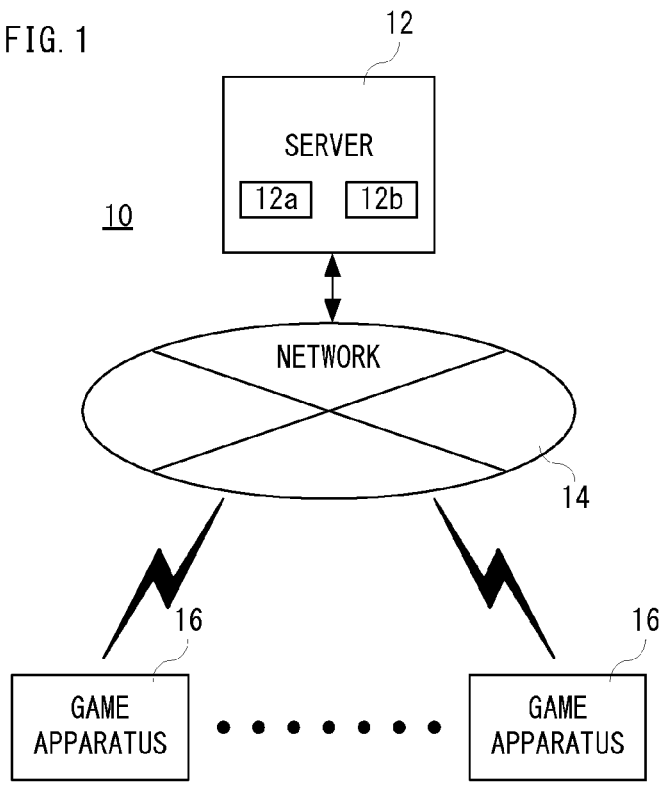
FIG. 1 shows a non-limiting example network game system according to the present invention.

With referring to FIG. 1, a non-limiting example network game system 10 includes a server 12, and the server 12 is connected with a plurality of game apparatuses 16 in a communication-capable manner via a network 14 such as an internet. The server 12 is a general-purpose server and comprises components such as a CPU 12a, a RAM 12b and a communication module, etc.

Figure 2:
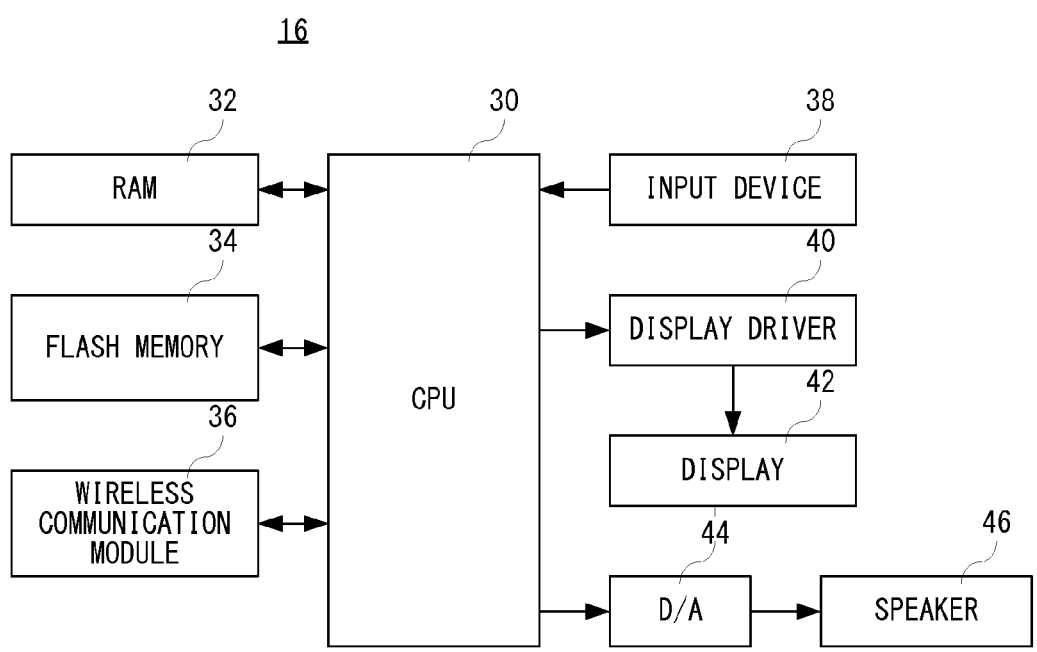
FIG. 2 is a block diagram showing a non-limiting example of electric structure of a game apparatus shown in FIG. 1.

FIG. 2 is a block diagram showing electric structure of the game apparatus 16 shown in FIG. 1. As shown in FIG. 2, the game apparatus 16 includes a CPU 30, and a RAM 32, a flash memory 34, a wireless communication module 36, an input device 38, a display driver 40 and a D/A converter 44 are connected to the CPU 30. Furthermore, a display 42 is connected to the display driver 40, and a speaker 46 is connected to the D/A converter 44.

The CPU 30 is in charge of entire control of the game apparatus 16. The RAM 32 is used as a working memory and a buffer memory for the CPU 30. The flash memory 34 is used to store a program of an application such as a game and store (save) various kinds of data.

The wireless communication module 36 has a function of connecting to a wireless LAN. Therefore, the game apparatus 16 can communicate with a computer (server 12, etc.) and another game apparatus 16 directly or via the network 14.

The input device 38 includes various kinds of push buttons or switches that are provided on the game apparatus 16, for example, and is used by the user for various kinds of operations such as a menu selection and a game operation, etc. However, as the input device 38, input means such as a pointing device including a touch panel, a microphone or a camera may be used instead of the push buttons or switches or together with the push buttons or switches.

The display driver 40 is used to display various images such as a game image on the display 42 under instructions by the CPU 30. Although illustration is omitted, the display driver 40 contains a video RAM (VRAM).

The D/A converter 44 converts sound data that is applied from the CPU 30 into an analog game sound and outputs the same to the speaker 46. In addition, the game sound means a sound required for a game such as imitation voices sounds of game characters or objects, a sound effect and music (BGM).

In addition, the electric structure of the game apparatus 16 shown in FIG. 2 is a mere example, and it does not need to be limited to this.

With the game apparatus 16 having such structure, it is possible to play a game (virtual game) wherein a player object, an enemy object and a background object are arranged in a virtual space, and the player object advances within the virtual space (virtual courses) with defeating the enemy object and/or evading the enemy object according to an operation by a player or user so as to clear respective stages.

In FIG. 3(A), for example, an example of a game screen 100 that is displayed on the display 42 during play of the virtual game as described above is shown. In this game screen 100, a player object 102 is displayed in a center lower part thereof and three enemy objects 104*a*, 104*b* and 104*c* are displayed at a right side of the player object 102. In addition, the enemy objects 104*a*, 104*b* and 104*c*, and 104*d* described later (see FIG. 3(B)) are the same kind object, and called a "enemy object 104" when there is no necessity of describing these individually.

Furthermore, an enemy object 106*a* of a kind different from a kind of the enemy object 104 is displayed at a center of the game screen 100. However, the enemy object 106*a* is the same kind object as the enemy objects 106*b* and 106*c* (see FIG. 3(B)) described later, and when there is no necessity of describing these individually, these are only called an "enemy object 106."

Furthermore, as shown in FIG. 3(A), in the game screen 100, a ground (floor) object 110, block objects 112 and an clay pipe object 114 are displayed as the background object.

As seen from FIG. 3(A), the player object 102 and the enemy object 104*a* are arranged on the ground object 110, and the enemy objects 104*b* and 104*c* are arranged on the block objects 112 stacked in a shape of stairs. Furthermore, the enemy object 106*a* is arranged on the block objects 112 arranged in the air in a shape of straight line. Furthermore, the clay pipe object 114 is arranged so as to pierce in the ground object 110.

The virtual game of this embodiment is a local game that is played by only the game apparatus 16 unlike a communication game that is played with communication with other game apparatuses 16, etc. Furthermore, this virtual game is a so-called horizontal scrolling game, and a basic advancing direction of the player object 102 is the right. In contrast, a basic advancing direction of the enemy objects 104 and 106 is the left, and these move toward the player object 102. However, if the enemy objects 104 and 106 hit the background object like the block objects 112 or the clay pipe object 114, they reverse the advancing direction.

The player makes the player object 102 walk or run rightward or leftward. Furthermore, the player can also make the player object 102 jump. For example, the player object 102 can defeat the enemy objects 104 and 106 by jumping to trample the enemy objects 104 and 106 from the top. On the other hand, if the player object 102 collides with the enemy objects 104 and 106 in a direction other than from the top, the player object receives damage. At this time, in some cases, it becomes a mistake, a remainder value of the player object 102 is subtracted, and the virtual game is resumed from the beginning of a current stage or a predetermined place in the middle of the current stage.

FIG. 3(B) shows an example of the game screen 100 about a different scene in the same stage as the game screen 100 shown in FIG. 3(A). In the game screen 100 shown in FIG. 3(B), the player object 102 and the enemy objects 106*b* and 106*c* are displayed as sequentially from the left on the ground object 110. Furthermore, a plurality of block objects 112 stacked in a shape of pillar or wall are displayed at a right side of the player object 106*c*, and the enemy object 104*d* and the block object 112 are displayed at a right side thereof.

Usually, in such a virtual game, the enemy objects of the same kind are displayed by the same image in order to make appearance the same. Specifically, in the examples of the game screen 100 shown in FIG. 3(A) and FIG. 3(B), the enemy objects 104*a*-104*d* are displayed with the same image, and the enemy objects 106*a*-106*c* are displayed with the same image.

It should be noted that the same kind means that not only appearance but performance (moving speed, jumping power, offensive strength, etc.) are the same, and a virtual shape and size that are used for a collision determination with the player object 102 are also the same.

However, it is thought that difficulty of defeating or evading such an enemy object differs dependent on an appearing position, timing, etc. even if these are the same kind of enemy objects (104*a*-104*d* or 106*a*-106*c*). This is true for not only a case where the same kind of enemy objects appear simultaneously in the same scene but a case where the same kind of enemy objects appear in separate scenes.

It is thinkable that it is easier to evade the enemy object in a case where the enemy object 104*d* comes and goes between the plurality of block objects 112 stacked in the center and the block objects 112 placed on the right side as shown in FIG. 3(B) in comparison with in a case where three enemy objects 104*a*-104*c* come in succession as shown in FIG. 3(A).

Specifically, in the game screen 100 shown in FIG. 3(B), it is thinkable that it is possible for the player object 102 to easily evade the enemy object 104*d* by making the player object 102 jump from the plurality of block objects 112 stacked in the center toward the block object 112 at the right side.

In contrast, in the game screen 100 shown in FIG. 3(A), it is relatively difficult for the player object 102 to evade the enemy objects 104a-104c because the enemy objects 104a-104c come in succession at approximately equal intervals. Furthermore, when defeating the enemy objects 104a-104c, the plurality of block objects 112 located in a shape of straight line may become obstructive. Furthermore, it is thought that the difficulty of evading or defeating differs among the enemy objects 104a-104c, respectively.

Although a specific description is omitted, it is thought that this is also true about the enemy objects 106a-106c.

Accordingly, in this embodiment, it is intended to let the player know the difficulty of game progress that changes with a position, timing, etc. that the enemy object (104, 106, etc.) appears by changing the image of the enemy object (104, 106, etc.) dependent to a frequency that the player object 102 (player) is hindered from advancing and thus the progress of the game is hindered. Hereinafter, described specifically.

However, there is no necessity that an object that hinders the game progress is limited to the enemy objects (104, 106, etc.). For example, an object that emits or stops a fire or flame for each predetermined time period at a fixed position (place) and an object that projects or retracts a needle for each predetermined time period at a fixed position (place) are also corresponding to the object that hinders the progress of the game. Furthermore, an object imitating a door that opens and closes and an object imitating a stone statue, fence (wire net) or elevator that goes up and down are also included. Furthermore, in a case of a racing game, in addition to objects of an oil or a puddle that makes a player object slip, objects imitating a tire, a pillar, a rock, an iceberg (a block of ice), etc. that are arranged or fly such that a course may be obstructed are also included. Therefore, hereinafter, the object that hinders the progress of the virtual game like the enemy objects (104, 106, etc.) will be collectively called a "hindrance object."

In addition, since only an image of the hindrance object including the enemy objects (104, 106, etc.) is changed, the progress or balance of the game is not affected. If changing an ability of the hindrance object, for example, the game balance is lost, and it is difficult to adjust the game balance.

In this embodiment, if the progress of the game is hindered during execution of the virtual game (during game) in a manner that the player object 102 receives damage from the enemy object (104, 106, etc.), information on the hindrance object (hereinafter called "hindrance information") is notified from the game apparatus 16 to the server 12. For example, the hindrance information is data that includes identification information (stage ID) of the stage (course) of the virtual game under execution, identification information (object ID) that indicates a kind of the hindrance object, and identification information (identification number, for example) for identifying each of the same hindrance object on at least the stage of the virtual game. It should be noted that the stage ID also includes identification information (game ID) that identifies a kind (title) of a virtual game.

Hereinafter, when only calling a "hindrance object", it is not necessary to take the kind of the hindrance object into consideration. When the kind of the hindrance object needs to be taken into consideration, a word "kind" is used for each time.

Furthermore, in the virtual game of this embodiment, each hindrance object appears at a timing that is determined in advance and at a position that is determined in advance. Therefore, in playing the same stage, the same hindrance object appears at the same position and the same timing for each time. This is true for a case where when the virtual game of this embodiment is executed (played) with another game apparatus 16.

The server 12 receives the hindrance information that is sent from each game apparatus 16, and counts the number of times of hindering the progress of the virtual game (the number of times of hindrance) for each hindrance object and for each stage of each virtual game. Furthermore, the server 12 totals, in response to a request from the game apparatus 16, the number of times of hindrance for each hindrance object about a requested stage so as to notify to the game apparatus 16. The game apparatus 16 determines an image for displaying each hindrance object based on the number of times of hindrance of each hindrance object that is notified.

FIG. 4(A)-FIG. 4(D) illustrate a case where the image (appearance) of the enemy object 104b among the enemy objects 104a-104c shown in FIG. 3(A). Furthermore, although it is made to change the image of the enemy object 104b in four steps, as long as two or more steps, the image may be changed in five or more steps.

FIG. 4(A) shows the enemy object 104b when difficulty is ordinary. The image of the enemy object 104b in this case is an image of a first step. Here, the enemy object 104b having an ordinary face image is displayed. In addition, in FIGS. 4(A)-4(D), other enemy objects 104a and 104c are illustrated (displayed) with images at the first step.

Furthermore, FIG. 4(B) shows the enemy object 104b when difficulty is a little high. The image of the enemy object 104b in this case is an image of a second step. Here, the enemy object 104b having an angry face is displayed.

Furthermore, FIG. 4(C) shows the enemy object 104b when difficulty is high. The image of the enemy object 104b in this case is an image of a third step. Here, the enemy object 104b exposing teeth with the angry face while changing colors of a face (head) and legs is displayed. For example, when the difficulty is ordinary or a little high, the colors of the face (head) and the legs of the enemy object 104b are thin orange, but when the difficulty is high, the colors of the face (head) and the legs of the enemy object 104b are changed to red.

Then, FIG. 4(D) shows the enemy object 104b when the difficulty is the highest. The image of the enemy object 104b in this case is an image of a fourth step. Here, a head top of the enemy object 104b of a case of the third step is shined so as to show a manner that the enemy object 104b is further angry.

As shown in FIG. 4(A)-FIG. 4(D), if the enemy object 104b is displayed in multi-steps, the appearance is changed gradually (little by little) when looking at sequentially from the uppermost view. However, a degree of change of the appearance that changes from the enemy object shown in FIG. 4(A) to the enemy object 104b shown in FIG. 4(C) or FIG. 4(D) is larger than a degree of change of the appearance that changes from the enemy object 104b shown in FIG. 4(A) to the enemy object 104b shown in FIG. 4(B). That is, the larger the number of times of hindrance, the larger the degree of changing the displaying of the hindrance object. Therefore, the player can know easily a magnitude (large and small) of the number of times of hindrance of the hindrance object, that is, the difficulty for defeating or evading the hindrance object by looking at the image of the hindrance object that is being displayed on the game screen 100.

Figure 8:
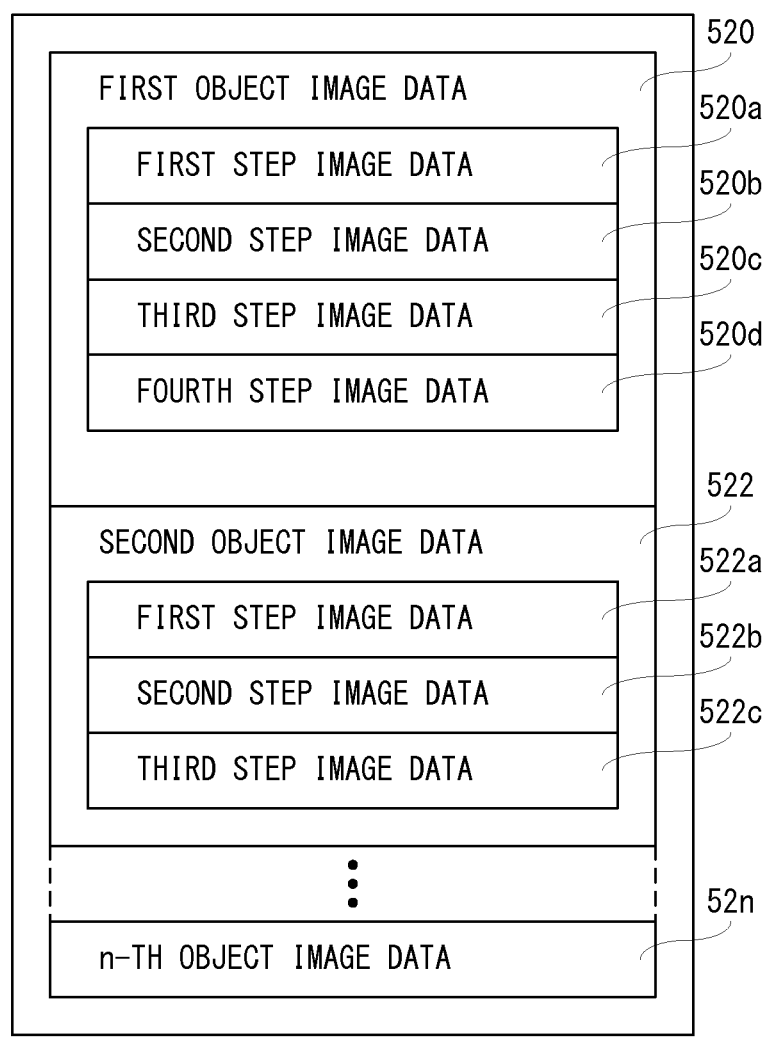
FIG. 8 shows a non-limiting example of specific contents of object image data shown in FIG. 7.

Furthermore, data about the image of the hindrance object of a case of the ordinary difficulty (before changed) and the image of the hindrance object of the higher difficulty than the ordinary difficulty (after changed) are stored in the game apparatus 16 that executes this virtual game (see FIG. 8). In the examples shown in FIG. 4(A)-FIG. 4(D), the data about the image of the first step is stored in the RAM 32 of the game apparatus 16 as an image before changed, and the data about the images of the second-fourth steps are stored in the RAM 32 of the game apparatus 16 as images after changed.

The game apparatus 16 determines, at a time of starting game processing in a certain stage, the images for displaying all the hindrance objects that appear on that stage. Then, during the execution of the virtual game, the game apparatus 16 draws (displays) each hindrance object with determined images.

In addition, an image is changed when two or more the same kind hindrance objects exist in the same stage; however, a hindrance object like a boss enemy object that only one exists in the same stage is not subjected to.

Specifically, as shown in FIG. 5(A), the server 12 manages (stores) statistical data about the number of times of hindrance for each virtual game. A game ID of a virtual game is applied to the statistical data, and the number of times of hindrance is totaled for each stage. In an example shown in FIG. 5(A), the number of times of hindrance is totaled for each of the first stage, the second stage, the third stage, --, the m-th stage. Furthermore, the number of times of hindrance is counted in each stage for each of all the hindrance objects (the first object, the second object, --, the n-th object) included in a corresponding stage. Specifically, as to each hindrance object, the number of times of hindrance for a past predetermined time period is counted for each unit time period that divides the predetermined time period equally. For example, there are provided with counters (variables) corresponding to the number that a value that is obtained by dividing the predetermined time period by the unit time period plus 1 (+1), and the number of times of hindrance is counted (subtotaled) for each unit time period by each counter.

In an example shown in FIG. 5(A), the counters are provided respectively corresponding to the first period, the second period, the third period, --, the p-the period, when the server 12 executes counting the number of times of hindrance first, the counter of the first period is used, for example. Then, if the unit time period elapses, the counter of the second period becomes to be used to count the number of times of hindrance. Thus, the counter used according to lapse of the unit time period is changed sequentially. Then, if the number of times of hindrance is counted by the counter of the p-th period and the unit time period further elapses, the counter of the first period becomes to be used next. The counter of the first period is reset at this time. That is, a count value is set as 0 (zero).

In addition, the subtotal of each period is equivalent to the count value of the counter provided for each period.

For example, in subtotaling hourly the number of times of hindrance for the past 10 (ten) hours, 11 (eleven) counters are provided, and the number of times of hindrance is counted while the counter that counts for each unit time period is changed one by one. For example, when the number of times of hindrance is currently counted (subtotaled) using the counter that is set for the fourth period, the number of times of hindrance for the past 10 hours is totaled (summed) by adding the count values of counters (the first to third periods, the fifth to eleventh periods) other than the counter that is set for the fourth period. That is, the counter that is currently performing counting counts the number of times of hindrance while the number of times of hindrance for the predetermined time period is totaled (summed) by adding the count values of the other counters.

Such counting processing of the number of times of hindrance is executed for each hindrance object (the first object, the second object, --, the n-th object).

On the other hand, if a virtual game is started, the game apparatus 16 requests the server to send the sum total (statistical data) of the number of times of hindrance for all the hindrance objects in a stage that is selected to play, and receives the statistical data from the server 12. Then, the game apparatus 16 determines a displaying step for each kind of hindrance object based on the statistical data. Specifically, the largest value of the number of times of hindrance is detected for each kind of the hindrance object. Next, threshold values for dividing the largest value of the number of times of hindrance into the number of displaying steps for each kind of the hindrance object are determined. An example of a determination method of the threshold values is shown in FIG. 5(B) and FIG. 5(C).

FIG. 5(B) shows an example of a case of dividing the largest value of the number of times of hindrance equally by the number of the displaying steps. For example, the largest value of the number of times of hindrance for a certain hindrance object is 300 (three hundreds), and when there are four displaying steps of the hindrance object (the first-fourth steps), the threshold values are determined so as to equally divide the largest value (300) into four. Therefore, the threshold values are determined as 75, 150 and 225. At this time, as to the displaying steps of the hindrance object, a first displaying step is determined when the number of times of hindrance is 0-74, a second displaying step is determined when the number of times of hindrance is 75-149, a third displaying step is determined when the number of times of hindrance is 150-224, and a fourth displaying step is determined when the number of times of hindrance is 225-300.

Furthermore, the largest value of the number of times of hindrance about a certain kind of hindrance object is 300, and when there are three displaying steps of the hindrance object (the first-third steps), for example, the threshold values are determined such that the largest value (300) is equally divided into three. Therefore, the threshold values are determined as 100 and 200. At this time, as to the displaying steps of the hindrance object, a first displaying step is determined when the number of times of hindrance is 0-99, a second displaying step is determined when the number of times of hindrance is 100-199, and a third displaying step is determined when the number of times of hindrance is 200-300.

Furthermore, in an example shown in FIG. 5(C), the displaying steps are weighted and the threshold values are determined such that a change to the second-fourth steps is made harder to be performed gradually by making the threshold value for determining the first step or the second step relatively larger. For example, in a case where the largest value of the number of times of hindrance about a certain kind of hindrance object is 300 and there are four displaying steps of the hindrance object (the first-fourth steps) and weights of the first step, the second step, the third step and the fourth step are set as 4:3:2:1, the threshold values are determined as 120, 210 and 270. At this time, as to the displaying steps of the hindrance object, a first displaying step is determined when the number of times of hindrance is 0-119, a second displaying step is determined when the number of times of hindrance is 120-209, a third displaying step is determined when the number of times of hindrance is 210-269, and a fourth displaying step is determined when the number of times of hindrance is 270-300.

In addition, determination methods of the threshold values shown in FIG. 5(B) and FIG. 5(C) are mere examples, and do not need to be limited. For example, instead of a case shown in FIG. 5(C), a change from the first step to the second-fourth steps may be made easy to perform gradually by weighting as 1:2:3:4.

Furthermore, although a case where the largest value is divisible by the number of the displaying steps is described in FIG. 5(B) and FIG. 5(C), if not divisible, the threshold values may be determined by truncating below a decimal point.

Furthermore, although the number of the displaying steps may be the same as for the hindrance object of all the kinds, or may differ. In this embodiment, the number of the displaying steps differs according to the kind of the hindrance object. However, the number of the displaying steps is determined by the number of the images stored (prepared) for each hindrance object.

Thus, since the displaying step for each kind of the hindrance object is determined for each stage, and each hindrance object is drawn (displayed) according to a determined displaying step, the player who looks at such a game screen 100 becomes to have new feelings in his/her play, "My taking care", "All attacked by that object", "Having defeated strong hindrance object", "All become not attacked by that object", etc., and therefore, an experience of the virtual game becomes deeper.

Figure 6:
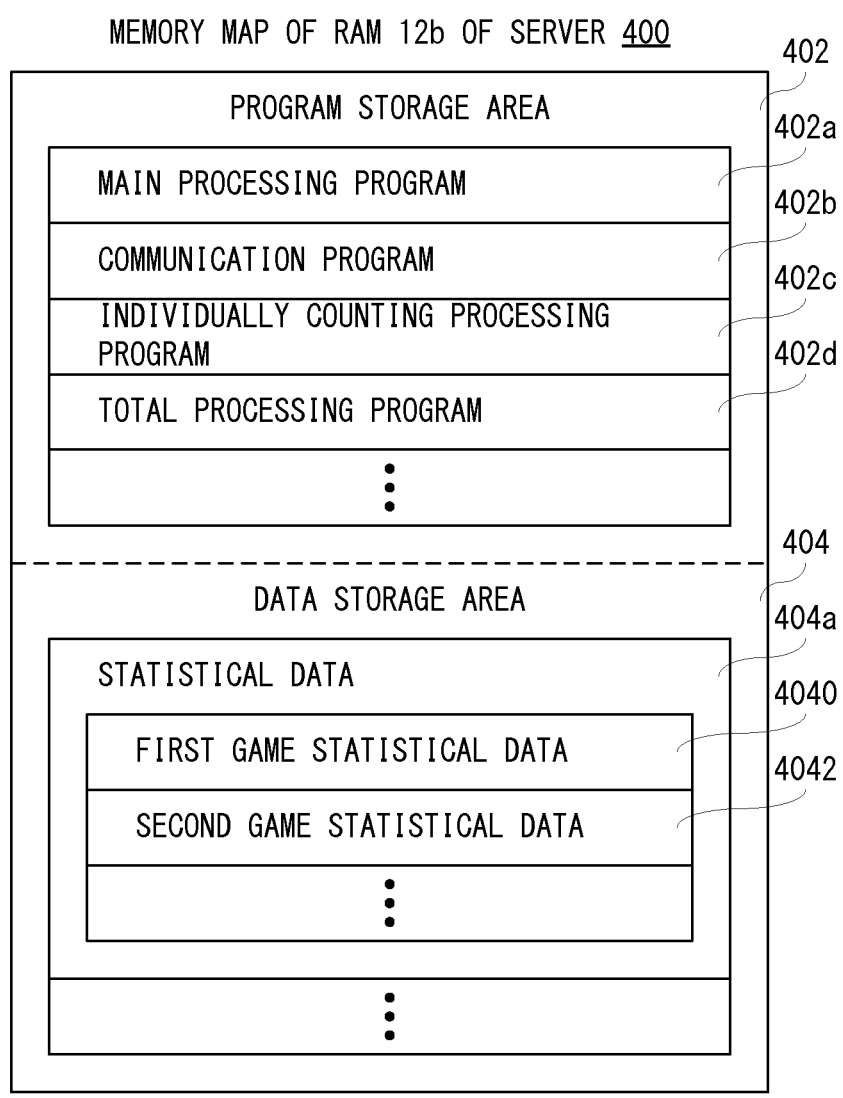
FIG. 6 shows a non-limiting example of a memory map of a RAM that is incorporated within the server shown in FIG. 1.

FIG. 6 shows an example of a memory map 400 of the RAM 12b incorporated in the server 12. As shown in FIG. 6, the RAM 12b incorporated in the server 12 includes a program storage area 402 and a data storage area 404. The program store area 402 is stored with an information processing program, and the information processing program is constituted by a main processing program 402a, a communication processing program 402b, an individually counting processing program 402c, a total processing program 402d, etc.

The main processing program 402a is a program for processing a main routine of the server 12. The communication program 402b is a program for performing a communication with an apparatus such as the game apparatus 16 or a computer directly or via the network 14.

The individually counting processing program 402c is a program for receiving the hindrance information from a plurality of game apparatuses 16, and counting the numbers of times of hindrance of for each of all the hindrance objects in each stage for each virtual game. The total processing program 402b is a program for totaling, in response to a request from the game apparatus 16, the number of times of hindrance for the past predetermined time period for each of all the hindrance objects in a requested stage so as to notify to the game apparatus 16.

Statistical data 404a, etc. are stored in the data storage area 404. The statistical data 404a is stored for each virtual game like first game statistical data 4040, second game statistical data 4042, and --. Details of each game statistical data is as shown in FIG. 5(A), and stored with structure (format) as shown in FIG. 5(A) in the data storage area 404.

Although illustration is omitted, in the data storage area 404, other data required for execution of the information processing program are stored, and a timer(s), a counter(s) and a flag(s) are provided.

Figure 7:
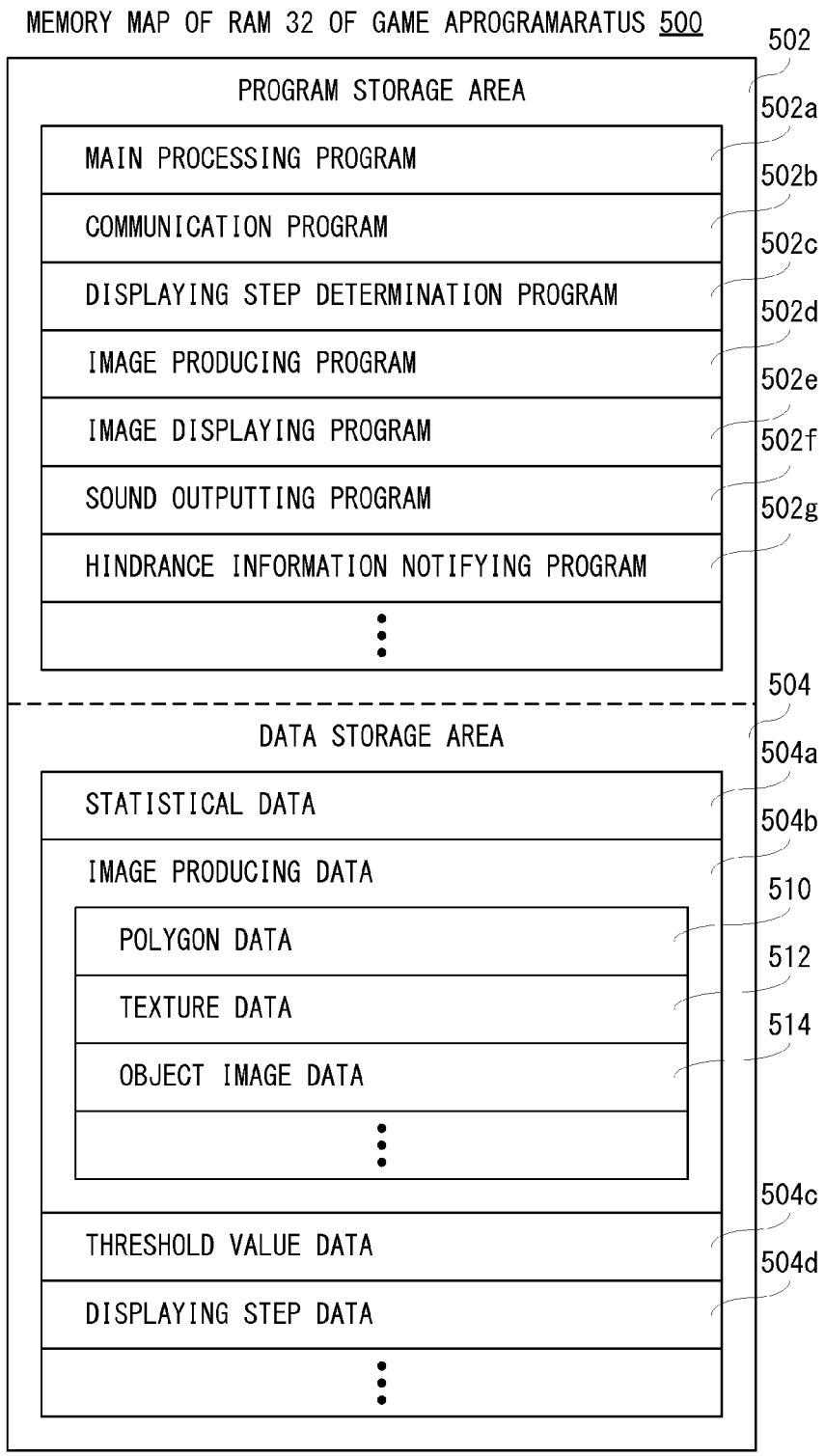
FIG. 7 shows a non-limiting example of a memory map of a RAM that is incorporated within the game apparatus shown in FIG. 1.

FIG. 7 shows an example of a memory map 500 of the RAM 32 incorporated in the game apparatus 16 shown in FIG. 2. As shown in FIG. 7, the RAM 32 includes a program storage area 502 and a data storage area 504. The program storage area 502 stores a game program, and the game program is constituted by a main processing program 502a, a communication program 502b, a displaying step determination program 502c, an image producing program 502d, an image displaying program 502e, a sound outputting program 502f, a hindrance information notifying program 502g, etc.

In addition, the game program is loaded from the flash memory 34, or downloaded from a computer or server (12, etc.) via the network 14, or loaded from a storage medium such as a game cartridge or an SD card that is attachable or detachable to or from the game apparatus 16. This is true for some data (image producing data in this embodiment) described later.

The main processing program 502a is a program for processing a main routine of a virtual game in this embodiment. The communication program 502b is a program for performing a communication with a computer (server 12) and other game apparatuses (16) directly or via the network 14.

The displaying step determination program 502c is a program for acquiring the statistical data from the server 12 and determining the displaying step of each hindrance object according to the number of times of hindrance of each hindrance object included in the statistical data. By executing this displaying step determination program 502c, the threshold values for determining the displaying steps for each hindrance object are also calculated when determining the displaying step.

The image producing program 502d is a program for producing game image data using image producing data 504b. The image displaying program 502e is a program for outputting to the display 42 the game image data that is produced according to the image producing programs 502d. Therefore, the game screen 100 as shown in FIG. 3 is displayed on the display 42.

The sound outputting program 502f is program for producing and outputting sounds required for game like voices or imitation sounds of the player object 102 and the enemy objects (104, 106, etc.), a sound effect and BGM. The hindrance information notifying program 502g is a program for producing hindrance information when the progress of the virtual game by the player object 102 is hindered by the hindrance object so as to notify to the server 12.

In the data storage area 504, statistical data 504a, image producing data 504b, threshold value data 504c and displaying step data 504d are stored. The statistical data 504a is data that the numbers of times of hindrance for each of all the hindrance objects in a stage are totaled, and is acquired from the server 12 at the time of starting the corresponding stage. Therefore, at every time that a stage is changed, the statistical data 504a is renewed.

The image producing data 504b includes polygon data 510, texture data 512, object image data 514, etc. for producing the game image data. The object image data 514 is data for producing (drawing) an image corresponding to a displaying step for each kind of the hindrance object. Specifically, as shown in FIG. 8, the object image data 514 includes first object image data 520, second object image data 522, --, n-th object image data 52n. Each of the first object, the second object, --, the n-th object is a hindrance object.

In an example shown in FIG. 8, the first object image data 520 includes first step image data 520a, second step image data 520b, third step image data 520c and fourth step image data 520d. That is, the first object can be displayed with images of four displaying steps.

Furthermore, the second object image data 522 includes first step image data 522a, second step image data 522b and third step image data 522c. That is, the second object can be displayed with images of three displaying steps.

Although illustration is omitted, the image data corresponding to displaying steps are similarly stored about other hindrance objects (the n-th object, etc.).

In addition, although the image producing data 504b also includes image data of enemy object, etc. other than the hindrance object, the number of the kinds of image data of the enemy object, etc. other than the hindrance object is one (1).

Returning to FIG. 7, the threshold value data 504c is numeral data about the threshold values for determining a displaying step, and is determined for each kind of the hindrance object and stored for each kind as described above. The displaying step data 504d is data that shows the displaying step determined for each of all the hindrance objects in the current stage.

Although illustration is omitted, the data storage area 504 is stored with data for producing sound data, etc. and provided with a timer(s), a counter(s) and a flag(s) that are required for execution of the game program.

Figure 9:
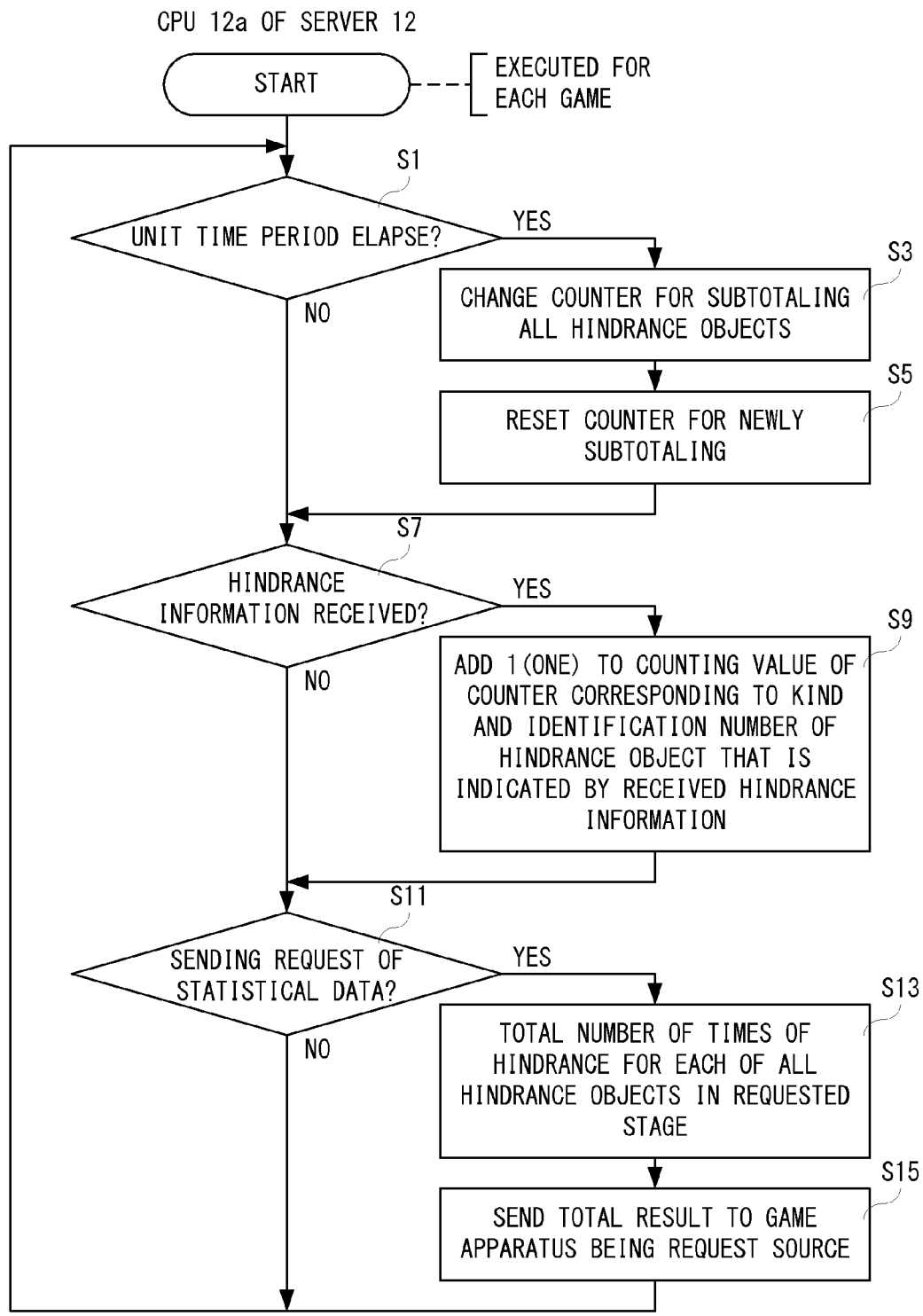
FIG. 9 shows a non-limiting example of a flowchart showing entire processing of a CPU of the server shown in FIG. 1.

FIG. 9 is a flowchart showing entire processing by the CPU 12a of the server 12 shown in FIG. 1. It should be noted that this entire processing is executed for each virtual game by executing the information processing program. As shown in FIG. 9, if the entire processing is started, the CPU 12a determines, in a step S1, whether the unit time period (1 hour, for example) elapses. When the entire processing is started, the CPU 12a starts a timer inside the server 12, and determines whether the count value becomes the unit time period. In this case, the timer is reset at every time that the unit time period elapses. Otherwise, the CPU 12a stores the time of the RTC that is provided in the server 12 at a time of starting the entire processing, and determines whether the unit time period elapses from the time being stored. In this case, the time that is stored is renewed at every time that the unit time period elapses.

If "NO" is determined in the step S1, that is, if the unit time period does not elapse, the process proceeds to a step S7 with no operation. On the other hand, if "YES" is determined in the step S1, that is, if the unit time period elapses, the counter that subtotals about all the hindrance objects is changed in a step S3. That is, the CPU 12a changes the counter that subtotals (counts) the number of times of hindrance to the counter that is set for a next unit time period. In a next step S5, the counter for newly subtotaling is reset (count value=0), and the process proceeds to a step S7.

In the step S7, it is determined whether the hindrance information from the game apparatus 16 is received. If "NO" is determined in the step S7, that is, if the hindrance information is not received, the process proceeds to a step S11 with no operation. On the other hand, if "YES" is determined in the step S7, that is, if the hindrance information is received, 1 (one) is added to the count value of (increments) the counter corresponding to the kind and the identification number of the hindrance object indicated by the hindrance information being received in a step S9, and the process proceeds to a step S11. However, in the step S9, the count value of the counter that is currently subtotaling is added by 1 (one) (incremented).

In the step S11, it is determined whether there is a sending request of the statistical data from the game apparatus 16. If "NO" is determined in the step S11, that is, if there is no sending request of the statistical data, the process returns to the step S1 with no operation. On the other hand, if "YES" is determined in the step S11, that is, if there is a sending request of the statistical data, the numbers of times of hindrance about all the hindrance objects in a requested stage are totaled in a step S13. That is, the CPU 12a totals (sums up) the count values of the counters other than the counter that is currently subtotaling, for each of the hindrance objects in the requested stage. Then, a total result (total data) is sent in a step S15 to the game apparatus 16 that is a requesting source, and the process returns to the step S1.

In addition, in this embodiment, when there is a sending request of the statistical data from the game apparatus 16, the numbers of times of hindrance about all the hindrance objects in the requested stage are totaled, but it does not need to be limited to this. For example, the numbers of times of hindrance about all the hindrance objects of each stage are totaled at a time that the counter that subtotals for all the hindrance objects is changed in the step S3, and if a sending request of the statistical data from the game apparatus 16, a total result of the numbers of hindrance times of hindrance about all the hindrance objects of the requested stage may be sent.

Figure 10:
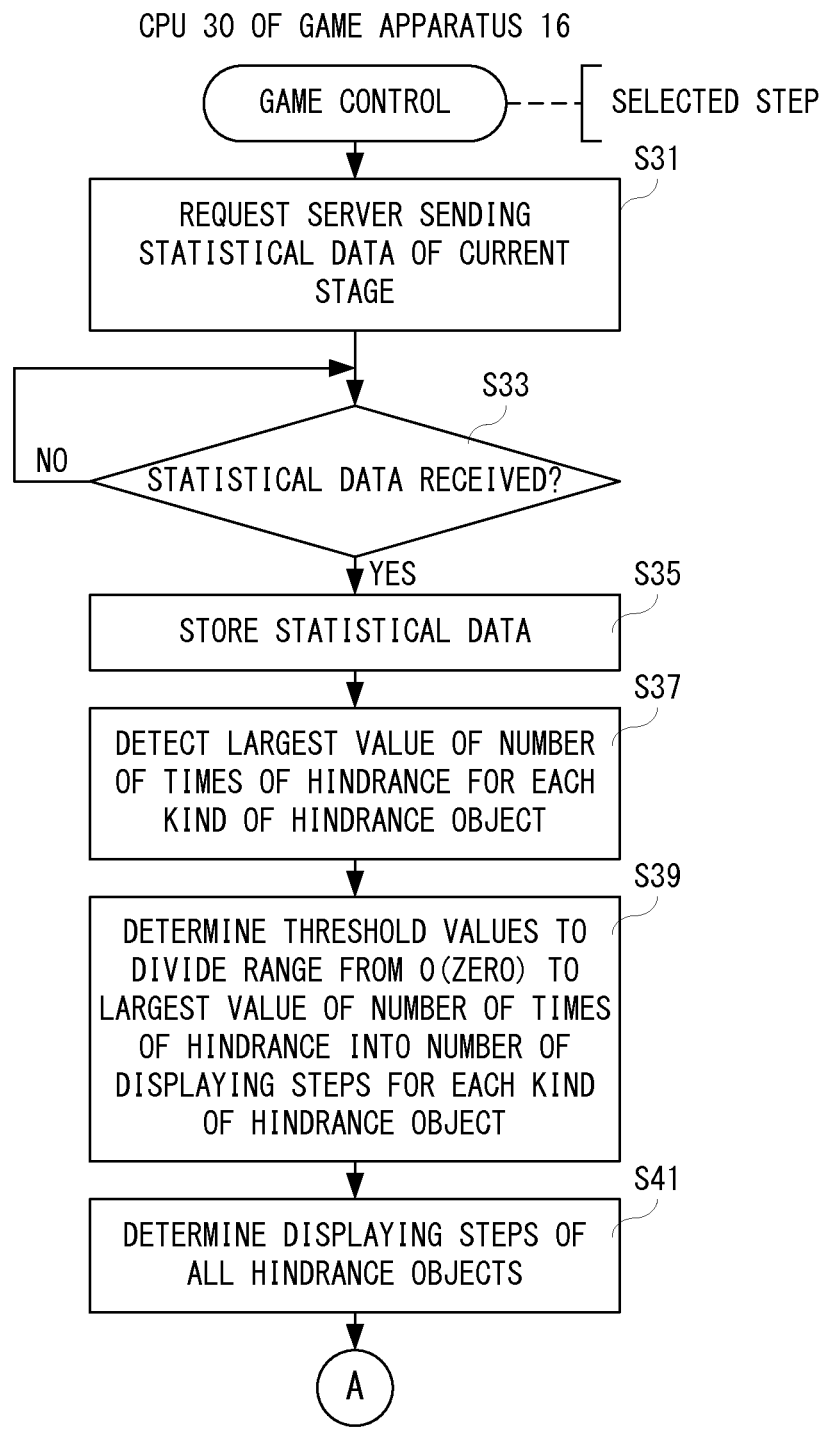
FIG. 10 shows a non-limiting example of a part of a flowchart of game control processing of a CPU of the game apparatus shown in FIG. 1.
Figure 11:
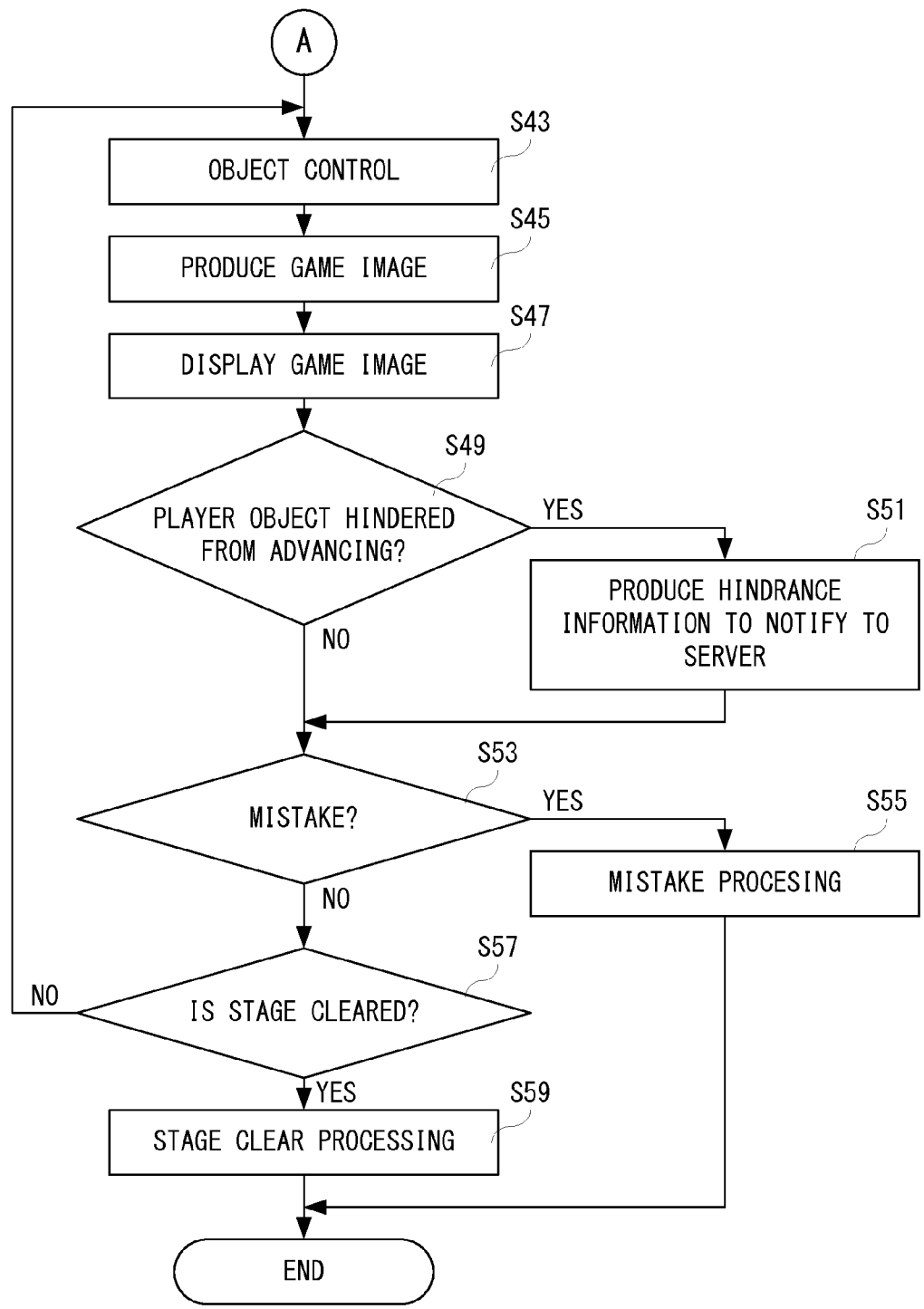
FIG. 11 is a non-limiting example of another part of the flowchart of the game control processing of the CPU of the game apparatus shown in FIG. 1, and follows FIG. 10.

FIG. 10 and FIG. 11 are flowcharts showing the game control processing of the CPU 30 of the game apparatus 16 shown in FIG. 2, and the game control processing is executed for a stage that the player selects. Therefore, displaying processing of a stage selection screen, selection processing of the stage by the player or a computer (CPU 30), etc. are executed by a main routine (not shown) of the virtual game.

As shown in FIG. 10, if the game control processing is started, the CPU 30 requests to the server 12 sending of the statistical data of this stage in a step S31. In a next step S33, it is determined whether the statistical data is received. If "NO" is determined in the step S33, that is, if the statistical data is not received, the process returns to the same step S33 as it is. However, when not receiving the statistical data for a long time (2-3 minutes), the game control processing may be started from the beginning, or usual game control processing without using the statistical data may be executed.

On the other hand, if "YES" is determined in the step S33, that is, if the statistical data is received, the statistical data 504a that is received is stored in the data storage area 504 in a step S35, and in a step S37, the largest value of the number of times of hindrance for each kind of the hindrance object is detected. In a next step S39, the threshold values for dividing the range from 0 (zero) to the largest value of the number of times of hindrance by the number of the displaying steps for each kind of the hindrance object are determined. At this time, the threshold value data 504c containing numeral data of the threshold values that are determined for each kind of the hindrance object are stored in the data storage area 504. Then, the displaying steps of all the hindrance objects are determined in a step S41. At this time, the displaying step data 504d that describes the displaying steps determined for each hindrance object is stored in the data storage area 504.

As shown in FIG. 11, the object is controlled in a next step S43. Here, the player object 102 is made to move or perform an arbitrary action in response to an operation by the player. Furthermore, the computer (CPU 30) makes enemy objects (104, 106, etc.) appear or move.

In a next step S45, a game image is produced. That is, the game image (game image data) about the current scene, including the player object 102, the enemy objects (104, 106, etc.) and the background objects is produced. At this time, the CPU 30 draws, with reference to the displaying step data 504d, the hindrance object including the enemy objects (104, 106, etc.), etc. with the image according to the displaying step that is determined. That is, the hindrance object is drawn using the image data according to the displaying step that is determined. As described above, the image data for each displaying step is included in the object image data 514.

Subsequently, the game image is displayed in a step S47. That is, the CPU 30 controls the display driver 40 to output the game image data that is produced in the step S45 to the display 42. Therefore, the game screen 100 as shown in FIG. 3(A) or FIG. 3(B) is displayed on the display 42.

In addition, the CPU 30 produces the sound data for the sound or voice required for the virtual game simultaneously or approximately simultaneously with the processing that produces the game image and displays the game image, and outputs the sound data to the speaker 46 via the D/A converter 44.

Next, in a step S49, it is determined whether the advancing of the player object 102 or the progress of the virtual game is hindered. Here, it is determined whether the player object 102 is hindered from advancing by the hindrance object in the virtual game. More specifically, it is determined whether the player object 102 receives damage from the enemy objects (104, 106, etc.) or is interfered from advancing by an object such as a rock object or a pillar object.

If "YES" is determined in the step S49, that is, if the advancing of the player object 102 or the progress of the virtual game is hindered, in a step S51, the hindrance information is produced and produced hindrance information is notified to the server 12, and the process proceeds to a step S53. In the step S51, the CPU 30 produces the hindrance information that includes the kind and the identification number of the hindrance object that hinders the progress of the virtual game and is added with the stage ID including the game ID, and sends such the hindrance information to the server 12.

On the other hand, if "NO" is determined in the step S49, that is, if the advancing of the player object 102 or the progress of the virtual game is not hindered, it is determined whether a mistake occurs in the step S53. For example, the CPU 30 determines whether the player object 102 is defeated by the enemy objects (104, 106, etc.), whether the player object 102 comes out of the course, or whether a limited time is exceeded before the player object 102 reaches the goal.

If "YES" is determined in the step S53, that is, if a mistake occurs, in a step S55, mistake processing is executed and the game control processing is terminated. For example, in the mistake processing, the game image in a situation that the player object 102 is defeated by the enemy objects (104, 106, etc.), the player object 102 comes out of the course, or the limited time elapses is displayed, and the sound representing that the mistake occurs is output. Furthermore, in the mistake processing, the number of the remainder of the player object 102 is decremented (subtracted by 1 (one)), and the game control processing about the same stage is started. In addition, when starting the game control processing of the same stage by mistake, the processing of steps S31-S41 may be omitted.

On the other hand, if "NO" is determined in the step S53, that is, if a mistake does not occur, it is determined whether the stage is cleared in a step S57. For example, the CPU 30 determines whether the player object 102 reaches the goal within the limited time, or the player object 102 defeats a boss enemy object. If "NO" is determined in the step S57, that is, if the stage is not cleared, the process returns to the step S43. On the other hand, if "YES" is determined in the step S57, that is, if the stage is cleared, stage clear processing is executed in a step S59, and then, the game control processing is terminated. For example, in the stage clear processing, a game image representing that the stage is cleared is displayed and a sound representing that the stage is cleared is output.

According to this embodiment, in the virtual game that is locally played by each game apparatus, the kind and the identification number of the hindrance object that hinders the progress of the virtual game is notified to the server so as to be totaled by the server, the image of the hindrance object that appears in the virtual game is changed using a totaled result in each game apparatus, and therefore, it is possible to easily know, during play of the game, an object that affects the progress of the game by other many players. That is, the player can know the difficulty that is unrelated to the ability of the hindrance object. Accordingly, it is possible to make the feelings of play richer.

Furthermore, according to this embodiment, since the appearance (image) of the hindrance object is only changed, the development cost can be suppressed.

Furthermore, according to this embodiment, since the statistical data for the predetermined time period is used, the player can know the hindrance object that troubles players connected with the network in the world at every time that the virtual game is played.

In addition, the hindrance information is immediately produced and sent when the player object is hindered from advancing by the hindrance object, but it does not need to be limited to this. The hindrance information may be just sent at a predetermined timing that does not have a bad influence on the game control processing in the game apparatus. Therefore, the hindrance information may be produced in advance, and the hindrance information may be collectively sent to the server at the time of the end of the game control processing. In addition, the hindrance information is usually produced and sent to the server when the player object is hindered from advancing by the hindrance object; however, when a load of the server is large, the hindrance information having been produced may be collectively sent at the time of the end of the game control processing. Furthermore, when it is determined as a mistake (is determined as "YES" in the step S53) or it is determined that the stage is cleared (is determined as "YES" in the step S57) in the game control processing, the hindrance information having been produced may be collectively sent.

Furthermore, although the image is wholly replaced according the displaying step in this embodiment, it does not need to be limited to this. A part of the image may be replaced, only a color (texture) may be changed, or all or a part of animation may be changed. Therefore, as the object image data (FIG. 7, FIG. 8) shown in the embodiment, according to the display step, image data about an image for replacing a part, image data about an image that only a color (texture) is changed, or animation data about an animation that all or a part is change may be stored.

Furthermore, in this embodiment, although an image is changed according to the number of times of hindrance, it does not need to be limited to this. Instead of the change of the image, the sound concerning the hindrance object may be changed. Otherwise, the image may be changed together with the sound. For example, since a normal position of the sound can be changed when outputting a stereo sound, it is possible to change the sound according to the position of the hindrance object in the three dimensional virtual game space. Accordingly, it is possible to change the sound according the difficulty that is unrelated to an ability value by changing a magnitude (volume) or a pitch of the imitation voice or sound of the enemy object or the sound effect (footstep, etc.) when the enemy object appears or moves, for example.

Furthermore, although the images about all the hindrance objects are changed using the statistical data in this embodiment, if the largest value for each kind of hindrance object is detected, about the hindrance object that the largest value is less than a predetermined value, the image thereof may not be changed.

Furthermore, in this embodiment, the number of times of hindrance for each hindrance object is totaled using the hindrance information that is sent from each game apparatus and the total result is sent to the game apparatus, but it does not need to be limited to this. For example, information on a player (age (generation), sexuality, a game history, for example) may be included in the hindrance information, and the number of times of hindrance may be totaled according to the information of the player so as to send the total result according to the player.

Furthermore, although the number of times of hindrance of each hindrance object is counted for each stage in this embodiment, the number of times of hindrance of each hindrance object may be counted regardless the stage, and the displaying step of the hindrance object of all the stages may be determined by such statistics.

Specifically, if a predetermined number of the enemy objects (here, called "enemy object A" and "A" indicates a kind of enemy object) of a certain kind appear on all the stages, and the number of times of hindrance is counted for each predetermined time period for each of the predetermined number of the enemy objects A, and the number of times of hindrance is totaled for each of the predetermined number of the enemy objects A. Then, a largest value is detected based on a total of the number of times of hindrance for each of the predetermined number of the enemy objects A, and the displaying step of the predetermined number of the enemy objects A that appear in all the stages is determined based on the largest value that is detected. Although a description is omitted, this is true for hindrance object such as an enemy object of other kinds.

Furthermore, although the largest value is detected for each kind of hindrance object and the displaying step is determined for each kind of hindrance object in this embodiment, it does not need to be limited to this. For example, by detecting a largest value of the number of times of hindrance about all kinds of the hindrance objects, the displaying step for each kind of the hindrance object may be determined using this largest value. If doing so, it is possible to make a difference for a change of the displaying between different kinds of hindrance objects, for example.

Furthermore, although the statistical data of a stage is acquired from the server when the stage is started in this embodiment, when the main routine of the virtual game is started, the statistical data about all the stages from the server may be acquired, and then, when a stage is started, the displaying step of each hindrance object may be determined using the statistical data of the stage.

Furthermore, although the hindrance information that includes information of the enemy object that the player object receives damage is sent to the server as data according to the progress of the virtual game in this embodiment, it does not need to be limited to this. For example, data including information of the enemy object that the player object defeats can be sent to a server as data according to the progress of the virtual game. In such a case, the server counts the number of times of having been defeated by the player object for each enemy object, and sends total data thereof to the game apparatus. Therefore, in the game apparatus, the displaying of each enemy object is changed according to the number of times that the player object defeats.

In this case, the statistical data is saved in a flash memory in response to data storing instructions by the player, or saved with a predetermined timing at the time of the end of a game, etc. in a flash memory. Then, the statistical data is read from the flash memory at a time of a game start of a next time so as to be stored in the RAM. In this case, a predetermined time period for subtotaling the number of times that the player object defeats is set relatively shorter. Furthermore, in this case, instead of subtotaling the number that the player object defeats for each predetermined time period, the number of times that the player object defeats after starting the virtual game until terminated may be subtotaled.

Even if doing in this way, when the player looks at the game screen, the feelings of "All defeat that object", "Mind being taken by the enemy here", "There being something if defeat that object", etc. are born.

In addition, in this embodiment, the server is prepared, and the server totals the number of times of hindrance for each hindrance object using the hindrance information that is sent from each game apparatus and the total result is sent to the game apparatus; however, the game apparatus counts the number of times of hindrance for each hindrance object so as to change the displaying step of the hindrance object according to the counted number. In this case, the statistical data is stored in the RAM of the game apparatus and the entire processing shown in FIG. 9 is also executed with the game apparatus. In addition, it is not necessary for the game apparatus to send a sending request of statistical data to the server and to acquire the statistical data from the server. Accordingly, in the entire processing in FIG. 9, there is no necessity of executing the processing of the steps S7-S15, and in the game control processing of FIG. 10 and FIG. 11, just to increment the count value of the counter corresponding to the kind and the identification number of the hindrance object in the step S51 without executing the processing of the steps S31-S35.

Even if doing in this way, when one player uses a game apparatus, the player becomes to have feelings of "Damaged by that enemy last time", "Take care about that object", "Defeat from the enemy here this time", etc., for example, by looking at the game screen. Furthermore, when a plurality of players change and use a single game apparatus, for example, if each player looks at the game screen, the feelings of "My taking care", "All attacked by that object", "Having defeated strong hindrance object", "All become not attacked by that object", etc., are born like a case of the above-described embodiment.

In addition, although this embodiment is described about a case where a portable game apparatus, it is needless to say that the present embodiment is also applicable to a stationary game apparatus, a desktop PC and an arcade game apparatus. Furthermore, it is possible to also use a notebook PC, PDA, a mobile phone, a smartphone, a tablet PC, etc.

In addition, the game apparatus of this embodiment may be constituted as a game system that a plurality of computers each executing a part of processing are connected in a communication-capable manner.

Furthermore, specific numerical values indicated in this embodiment are mere examples, and should not be limited, can be changed suitably according to an actual product.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What we claimed is:

1. A network game system that comprises a server and a plurality of game apparatuses, wherein
each of the plurality of game apparatuses comprises:
a first data sending module configured to send, to the server, first data according to progress of a game, the first data being information about a hindrance object that hinders the progress of the game;
a data acquisition module configured to acquire, from the server, second data that is based on a total of the first data from the plurality of game apparatuses; and
an appearance change module configured to change an appearance of an object that appears in the game based on the second data that is acquired by the data acquisition module;
the server comprises:
a data reception module configured to receive the first data sent by the first data sending module of each of the game apparatuses;
a totaling module configured to total the amount that the progress of the game is hindered based on the first data received by the data reception module; and
a second data sending module configured to send, to the game apparatuses, the second data that is totaled by the totaling module; and
the appearance change module of each of the game apparatuses is configured to change the appearance of the hindrance object according to the amount that the progress of the game is hindered.

2. A network game system according to claim 1, wherein the appearance change module of each of the game apparatuses is configured to change the appearance of the hindrance object when the amount that the progress of the game is hindered is equal to or more than a predetermined value.

3. A network game system according to claim 1, wherein the appearance change module of each of the game apparatuses is configured to vary the change in the appearance of the hindrance object such that the degree of the change in the appearance of the hindrance object becomes larger as the amount that the progress of the game is hindered becomes larger.

4. A network game system according to claim 3, wherein the appearance change module of each of the game apparatuses is configured to change the appearance of the hindrance object in multiple stages.

5. A network game system according to claim 1, wherein a plurality of hindrance objects hinder the progress of the game, and wherein the appearance change module of each of the game apparatuses is configured to change the appearance of the hindrance objects according to the number of the hindrance objects that hinder the progress of the game.

6. A network game system according to claim 1, wherein each game apparatus further comprises an image data storing module that is configured to store image data corresponding to images before and after the appearance of the object is changed.

7. A network game system according to claim 1, wherein each game apparatus further comprises a sound change module configured to change a sound concerning an object that appears in the game based on the second data that is acquired by the data acquisition module thereof.

8. A network game system according to claim 1, wherein the game is a local game that is executed in the respective game apparatuses.

9. A network game system according to claim 1, wherein the first data sending module of each of the game apparatuses is configured to send the first data to the server at a predetermined timing during the game.

10. A network game system according to claim 1, wherein the data acquisition module of each of the game apparatuses is configured to acquire the second data from the server at a time of starting the game.

11. A network game system according to claim 1, wherein the totaling module is configured to subtotal the amount that the progress of the game is hindered for each unit time period that is shorter than a predetermined time period, and to total subtotals other than the amount that is being subtotaled when the second data is requested from the game apparatus.

12. A game apparatus, comprising:
a first data sending module configured to send, to a server, first data according to progress of a game, the first data being information about a hindrance object that hinders the progress of the game;
a data acquisition module configured to acquire, from the server, second data that is based on a total of first data from a plurality of game apparatuses, the server comprising (a) a data reception module configured to receive the first data sent by the first data sending module of each of the game apparatuses in the plurality of game apparatuses, (b) a totaling module configured to total the amount that the progress of the game is hindered based on the first data received by the data reception module, and (c) a second data sending module configured to send, to the game apparatuses in the plurality of game apparatuses, the second data that is totaled by the totaling module; and an appearance change module configured to change an appearance of an object that appears in the game based on the second data that is acquired by the data acquisition module, wherein the appearance change module of the game apparatus is configured to change the appearance of the hindrance object according to the amount that the progress of the game is hindered.

13. A non-transitory computer readable storage medium storing a game program to be executed by a game apparatus, wherein the game program causes a computer of the game apparatus to execute functionality comprising:

sending, to a server, first data according to progress of a game, the first data being information about a hindrance object that hinders the progress of the game;

acquiring, from the server, second data that is based on a total of first data from a plurality of game apparatuses, the server being configured to (a) receive the first data sent from each of the game apparatuses in the plurality of game apparatuses, (b) total the amount that the progress of the game is hindered based on the first data received, and (c) send, to the game apparatuses in the plurality of game apparatuses, the second data that is totaled; and changing the appearance of the hindrance object according to the amount that the progress of the game is hindered.

14. A game control method that a computer of a game apparatus performs, the method comprising:

(a) sending to a server first data according to progress of a game, the first data being information about a hindrance object that hinders the progress of the game;

(b) acquiring from the server second data that is based on a total of first data from a plurality of game apparatuses, the server being configured to (i) receive the first data sent by the first data from each of the game apparatuses in the plurality of game apparatuses, (ii) total the amount that the progress of the game is hindered based on the first data received, and (iii) send, to the game apparatuses in the plurality of game apparatuses, the second data that is totaled; and (c) changing an appearance of an object that appears in the game based on the second data that is acquired in (b) such that the appearance of the hindrance object is changed according to the amount that the progress of the game is hindered.

15. A network game system, comprising:
a server; and
a plurality of game-playing apparatuses, each game-playing apparatus comprising processing resources including at least one processor, the processing resources being configured to control the respective game-playing apparatuses to at least:
execute an instance of a game;
generate, for output and in accordance with execution of the instance of the game, a game screen including a representation of an obstacle; and
transmit, to the server, first data indicative of a number of times the obstacle is unsuccessfully encountered;
wherein the server includes executable program logic configured to at least:
receive the first data transmitted from the game-playing apparatuses;
aggregate, as second data, a statistic related to the number of times the obstacle is unsuccessfully encountered in executing the instances of the game, based on the received first data; and
transmit, to the game-playing apparatuses, the second data; and
wherein the processing resources are further configured to control the respective game-playing apparatuses to at least:
receive the second data from the server; and
generate, for output and in accordance with execution of the instance of the game, an updated game screen including an altered representation of the obstacle, the altered representation of the obstacle being based on the second data received from the server and being at least visually indicative of a level of difficulty associated with the obstacle.

16. A network game system according to claim 15, wherein the obstacle has a pre-programmed ability that remains constant, despite its representation being altered over time.

17. A network game system according to claim 15, wherein the processing resources are further configured to control the respective game-playing apparatuses to at least generate, for output and in accordance with execution of the instance of the game, updated game screens including sequentially altered representations of the obstacle, the sequentially altered representations corresponding to the second data meeting or exceeding successive predefined thresholds over time.

18. A network game system according to claim 15, wherein the obstacle is an enemy character in, or structural feature of, the game.

19. A network game system according to claim 15, wherein the statistic is a count.

20. A network game system according to claim 1, wherein the second data corresponds to a numerical statistic computed by the server.

21. A network game system according to claim 1, wherein first data further represents an unsuccessful encounter with the hindrance object.

22. A network game system according to claim 1, wherein appearance changes visually indicate difficulty levels.

23. A network game system according to claim 1, wherein an appearance change to the hindrance object is not accompanied by a change to an ability of the hindrance object.

* * * * *